Feb. 25, 1930.   P. WERTHMANN   1,748,160
AUTOMOBILE POWER TRANSMISSION MECHANISM
Filed Nov. 19, 1928   2 Sheets-Sheet 1

Inventor
P. Werthmann
By *Arthur H. Sturges*
Attorney

Feb. 25, 1930.                P. WERTHMANN                1,748,160
               AUTOMOBILE POWER TRANSMISSION MECHANISM
                    Filed Nov. 19, 1928      2 Sheets-Sheet 2

Inventor
P. Werthmann
By Arthur H. Sturges
                Attorney

Patented Feb. 25, 1930

1,748,160

UNITED STATES PATENT OFFICE

PAUL WERTHMANN, OF CROFTON, NEBRASKA

AUTOMOBILE POWER-TRANSMISSION MECHANISM

Application filed November 19, 1928. Serial No. 320,405.

The present invention relates to jacks or power take-off devices adapted for use particularly with motor vehicles, so as to utilize the power of the vehicle for driving machinery and the like.

An object of the present invention is to provide a power take-off device of this character which may be easily transported from place to place about a farm or the like, and which is adapted to provide motive power for operating corn shellers, wood saws, grain elevators, feed grinders, tools, and various other pieces of machinery capable of being driven.

Another object of the invention is to provide a power take-off device of this character which may be readily adjusted or adapted to practically any standard type of automobile.

A further object of the invention is to provide a device of this character with driving members adapted to engage the wheels of a vehicle and which may be driven therefrom with relatively small amount of friction, and the consequent conservation of power, and to provide a device of this general character which may be easily knocked down for shipment and occupy relatively small space, and which may be quickly and easily set up by the user at any desired point where the power is desired.

The invention still further aims at a power take-off mechanism of this character which is provided not only with a belt drive for various pieces of machinery, but which is also provided with an independent means for operating a grain elevator or the like.

The above, and various other objects and advantages of this invention, will in part be described in, and in part be understood from, the following detailed description of the present preferred embodiment, the same being illustrated in the accompanying drawings wherein.

Figure 1:
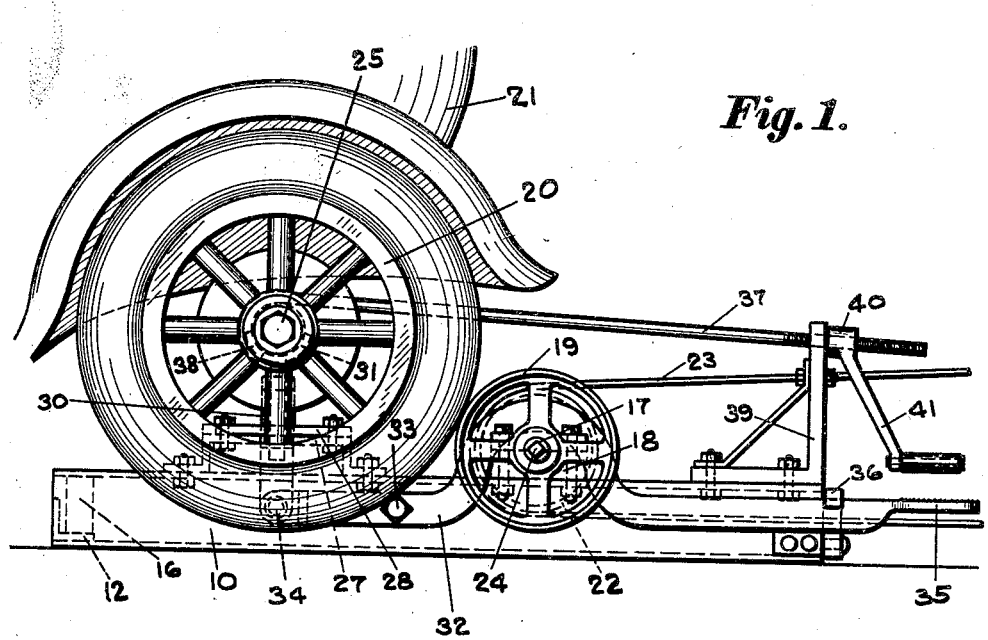
Figure 1 is a side elevation of a power take-off device constructed according to the present invention and as applied to the wheel of a motor vehicle from which the power is derived.

Referring now to the drawings for a more complete description of the present embodiment of the invention, and wherein like parts are designated by similar numerals of reference throughout the several views, 10 and 11 designate a pair of longitudinal spaced apart beams which constitute the frame or body members of the device, and which are preferably of channel construction arranged with their flange portions extending inwardly towards one another. The forward end of the body frame, or the end which is adapted to project beneath the motor vehicle, as shown in Figure 1, has the side beams 10 and 11 thereof connected together by forward cross member 12, which is preferably of angle iron construction and which extends across the lower portion of the side beams 10 and 11 and is detachably secured thereto by bolts 13.

The rear ends of the side beams 10 and 11 are also secured in suitably spaced apart relation to one another by means of a cross bar 14, secured by bolts 15 to the lower flanges of the side beams 10 and 11. As shown to advantage in Figure 3, the side beams 10 and 11 are interbraced with the cross members 12 and 14 by diagonal or corner braces 16 detachably secured as to their opposite ends to the respective side beams and cross members by bolts or the like as shown.

Intermediate the ends of the frame is disposed a transverse power take-off shaft 17, which is supported in suitable bearings 18 mounted on the side beams 10 and 11, and which is provided near its opposite ends with friction pulleys 19 so located and of sufficient size as to engage the peripheral or tire portions of wheels 20 mounted in the usual manner upon the rear end of an automobile 21, as shown in Figure 1. The automobile 21 and the wheels 20 are of conventional form so that the wheels 20 are driven by the engine and power transmission mechanism of the vehicle, and this driving or operation of the wheels 20 is taken advantage of by use of the present invention.

The shaft 17 is provided intermediate its ends, and between the side beams 10 and 11, with a belt pulley 22 adapted to receive a belt 23 thereover which may extend to any suitable mechanism, machinery or the like which is capable of being driven from the shaft 17. Either one or both ends of the shaft 17 may be provided with noncircular, square, or other shank portions 24, which serve as one member of a coupling by means of which the shaft 17 may be connected to a grain elevator or the like.

The vehicle 21 is shown as having a rear axle 25 enclosed in a housing 26, and which is adapted to be elevated and supported in such position that the drive wheels 20 of the vehicle will be raised from the ground for free rotation with respect thereto, and will be frictionally held against the friction pulleys 19. The side beams 10 and 11 are provided, near their end portions, with a pair of registering brackets 27 which may be bolted or otherwise suitably secured to the upper flanges of the side beams 10 and 11, and which are provided with outwardly extending horizontal guide plates 28.

Figure 2:
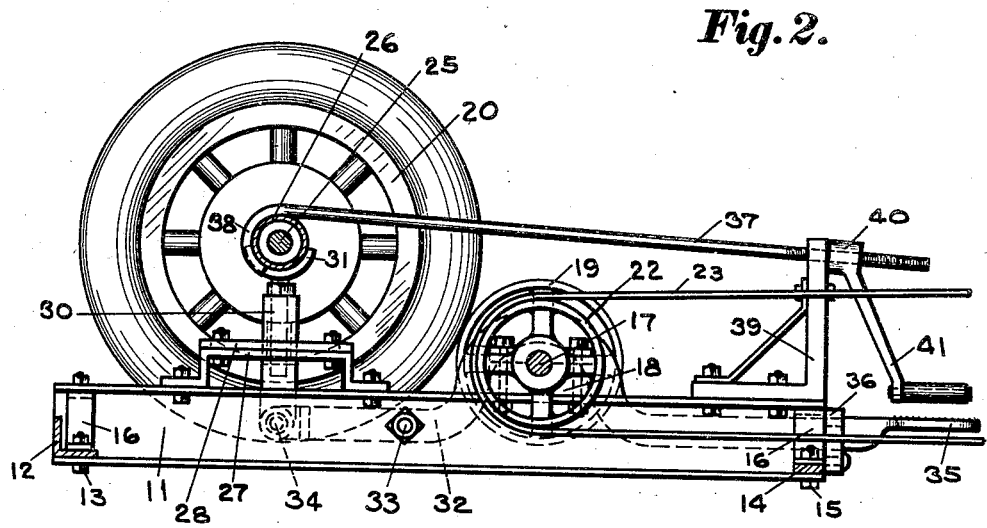
Figure 2 is a vertical longitudinal section taken through the same, substantially on the line 2—2 of Figure 4.

The guide plates 28 each have a longitudinally extending slot 29 therein, the slots being formed in the portions of the guide plates which project laterally and outwardly from the brackets 27. Each guide plate 28 is provided with a jack post 30 which extends upwardly through the slot 29 and which, as shown in Figure 2, may comprise an outer base part and an inner adjustable part, the latter having a concave socket 31 upon its upper end adapted to seat against and receive therein the housing 26 of the rear axle of the vehicle.

The device is provided at each side with a longitudinally extending hoisting lever 32, each lever 32 being pivoted to an adjacent side beam, 10 or 11, by a pivot bolt 33 disposed between the shaft 17 and the brackets 27. The front ends of the levers 32 constitute the short arms thereof and are pivotally connected at 34 to the lower ends of the jack posts 30. The hoisting levers 32 are arched upwardly in spaced relation over the opposite end portions of the shaft 17 and are carried rearwardly beyond the shaft and terminate in pedals 35.

Mounted on the rear ends of the frame bars 10 and 11 are hooks or catches 36 positioned to engage the rear end portions of the hoisting levers 32 when the latter are depressed so as to hold the vehicle wheels in raised position and against the friction pulleys 19.

Figure 3:
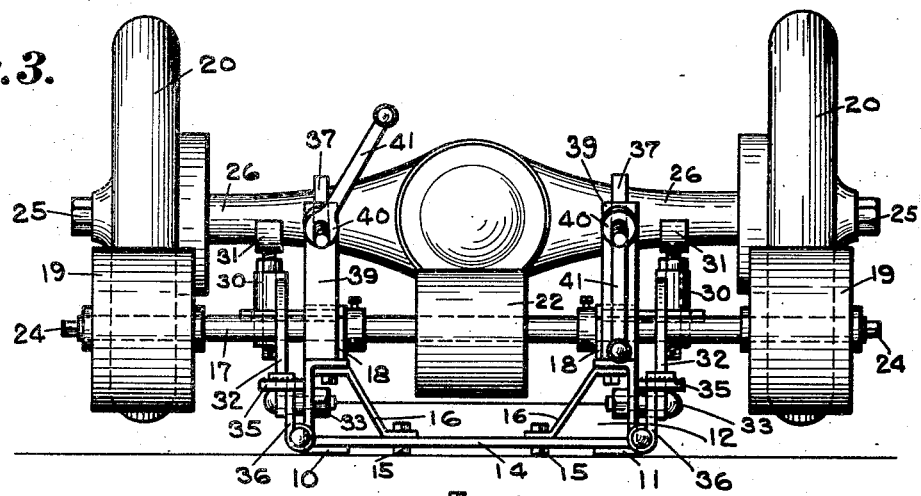
Figure 3 is a rear elevation of the device as applied to the vehicle.
Figure 4:
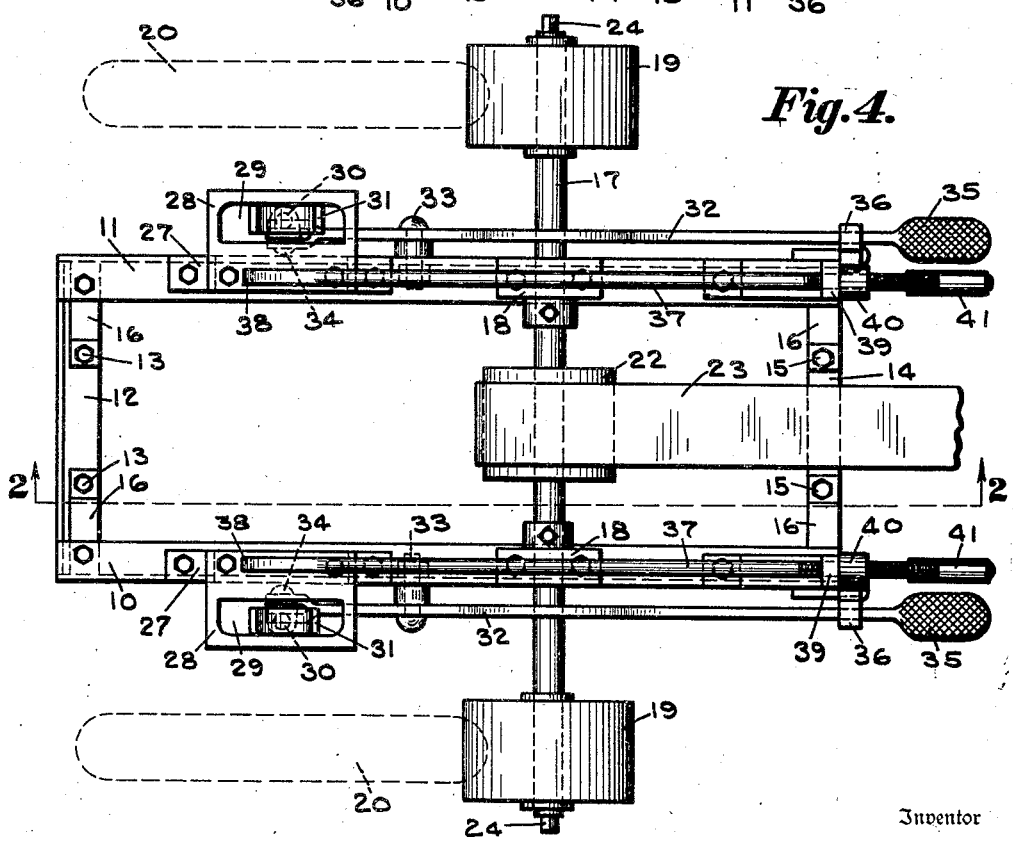
Figure 4 is a top plan view of the same.

For the purpose of adjustably holding the wheels 20 against the friction pulleys 19, anchoring rods 37 are provided with overturned or hook portions 38 at their forward ends proportioned to engage the axle housing 26. The rods 37 extend rearwardly and are provided with screw threads throughout a considerable portion of their rear ends. Standards 39 are secured upon the rear end portions of the side beams 10 and 11 and extend upwardly and are apertured for freely receiving the rear end portions of the anchoring rods 37 therethrough. Adjusting nuts 40 are mounted in threaded engagement upon the rear ends of the rods 37, and are adapted to be turned up against the upper ends of the standards 39 for drawing the rods 37 rearwardly and binding the wheels 20 with the desired tension against the friction pulleys 19. The adjusting nuts 40 are provided with crank handles 41 which may be freely rotated when the pedals 35 are depressed, as shown in Figure 3.

Thus, the adjustments may be easily and quickly made, and the desired tension placed upon the wheels 20 so as to minimize friction and at the same time obtain the necessary driving traction between the wheels 20 and the pulleys 19.

In use, it is only necessary to back the vehicle 21 over the forward end of the frame of the device, or to push the wheels of the vehicle 21. The jack posts 30 are now adjusted to the rear axle housing 26 so that the concave socket 31 may fit the axle housing and so that the jack posts 30 are of sufficient length to elevate the axle 25 of the motor vehicle when the levers 32 are operated.

After the jack posts 30 have been adjusted to the axle housing 26, the anchoring rods 37 may now be engaged with the axle housing 26 so as to keep the vehicle from moving forwardly away from the device when the levers 32 are operated. The levers 32 are now depressed at their rear ends with the result that the jack posts 30 are raised and the axle housing 26 and drive wheels 20 of the motor vehicle are also elevated. As the anchoring rods 37 are engaged with the axle housing 26, and as the jack posts 30 are pivotally mounted at their lower ends, the drive wheels 20 of the vehicle swing rearwardly against the friction pulleys 19 and are supported against the same.

When the levers 32 are secured in depressed position by means of the catches 36, as shown in Figure 1, the anchoring rods 37 are now drawn tight by operating the adjusting nuts 40 so that the drive wheels 20 of the vehicle are held in the desired frictional contact with the pulleys 19.

The rear axle 25 of the motor vehicle is now driven in the usual manner and at the desired speed with the result that the drive wheels 20 are rotated and this motion is communicated to the friction pulleys 19 and the shaft 17. By means of the belt 23 and the square shank 24, this power of the shaft 17 may be communicated either separately or simultaneously to the different mechanisms or devices which are connected to the belt 23 and to the square shank 24.

It is apparent that the device is of extreme simplicity, comprises relatively few parts and such parts are substantially of stock construction, and that therefore the device may be economically manufactured, and easily knocked down and set up without the exercise of skill so that the device may be economically handled. As above described, the device may be quickly and easily attached to the motor vehicle, and the various adjustments may be had with ease and without the use of separate tools or the like which take up considerable time, and there are few or no parts to get out of adjustment or to be easily broken.

The device rests close to the ground, and the vehicle need be raised but a very short distance, it will also be noted that the lower run of the belt 23 may be positioned close to the ground on account of the cross bar 14 being relatively flat and the spacing apart of the side beams 10 and 11 sufficiently to permit of the free operation of the pulley 22 and belt 23 therebetween. It is also apparent that cross bars or members 12 and 14 of different lengths may be used in order to make a body frame of desired width, and when the device is made as shown in the present drawings, it may be quickly and easily applied to various types of motor vehicles, trucks and the like, without requiring any adjustment or resetting of the parts. The hoisting mechanism of this device is relatively simple so that the rear wheels of the vehicle may be quickly and easily elevated and seated on the friction pulleys 19, and the wheels held thereto with the desired pressure by means of the adjusting nuts 40 which may be quickly and easily manipulated. The device is so constructed that no rivets or other permanent fastening devices need be used, bolts, such as 13 and 15, are used which are readily removable and quickly replaceable for knocking down and setting up the device.

It is of course understood that various changes and modifications may be made in the details of construction and design of the above specifically described embodiment of this invention without departing from the spirit thereof, such changes and modifications being restricted only by the scope of the following claims.

What is claimed is—

1. A power take-off device for use with vehicles, comprising a frame adapted to be seated on the ground, a transverse shaft mounted on the frame and provided with spaced apart friction pulleys, a pair of jack posts pivotally mounted upon the frame, guides carried by the frame for maintaining the jack posts for swinging in a longitudinal path with respect to the frame, means for elevating said jack posts for engaging the rear axle of a vehicle and raising the same to engage the drive wheels of the vehicle with said friction pulleys of the transverse shaft, and anchoring means carried by the frame for connection with said axle to bind the drive wheels of the vehicle in frictional contact with said pulleys.

2. A power take-off device for use with a motor vehicle, comprising a knock-down longitudinal frame adapted to be seated on the ground, a power take-off shaft mounted transversely of the frame intermediate the ends of the latter and provided near its opposite ends with friction pulleys adapted to engage the drive wheels of a motor vehicle, a pair of brackets mounted upon said frame forwardly of said transverse shaft and having guides thereon, jack posts mounted in said guides and adapted to swing at their upper ends toward and from said shaft and provided with axle engaging means on their upper ends for elevating the drive axle of the motor vehicle and the drive wheels therewith, a pair of hoisting levers pivotally mounted upon said frame and having short arms pivotally connected to said jack posts for supporting the same, the opposite ends of said levers adapted to be swung downwardly for raising said jack posts, means for locking said levers in depressed position to support the jack posts in elevated position, a pair of anchoring rods, standards upstanding from the rear end portions of said frame for slidably supporting the rear ends of said anchoring rods, said anchoring rods having hooks upon their forward ends adapted to engage said axle of the vehicle, and manually operable adjusting means connected to the rear ends of said anchoring rods and engaging said standards for drawing said anchoring rods rearwardly and binding the drive wheels of the vehicle in desired frictional contact with said pulleys of the power take-off shaft, said shaft having connecting means thereon for connecting the shaft to implements and machines adapted to be operated.

3. A power take-off device for use with motor vehicles comprising a frame, a shaft on said frame, means on the shaft to engage with the drive wheels of a motor vehicle whereby to drive said shaft, brackets on said frame having guides, jacks mounted swingingly in said guides, hoisting levers pivotally mounted on said frame and connected to said jacks for supporting and moving the same, means on the frame for retaining said levers in position to elevate the jacks, anchoring rods adapted to engage with the vehicle axle, standards on the frame for slidably supporting said anchoring rods, means co-operating with said standards to draw the rods in one direction, and means on the shaft for transmitting power therefrom.

In testimony whereof, I have affixed my signature.

PAUL WERTHMANN.